US008247932B1

(12) United States Patent
Larivé et al.

(10) Patent No.: US 8,247,932 B1
(45) Date of Patent: Aug. 21, 2012

(54) METHOD FOR MITIGATING BEARING FAILUE IN AN AC INDUCTION MOTOR AND APPARATUS THEREFOR

(76) Inventors: René Larivé, Grand-Mère (CA); Dany Larivé, Grand-Mère (CA)

( * ) Notice: Subject to any disclaimer, the term of this patent is extended or adjusted under 35 U.S.C. 154(b) by 0 days.

(21) Appl. No.: 13/373,538

(22) Filed: Nov. 17, 2011

Related U.S. Application Data

(60) Provisional application No. 61/460,937, filed on Jan. 11, 2011.

(51) Int. Cl.
*H02K 5/24* (2006.01)
(52) U.S. Cl. .......................................... 310/51; 310/90
(58) Field of Classification Search .................... 310/51, 310/89–90
See application file for complete search history.

(56) References Cited

U.S. PATENT DOCUMENTS

| 3,026,781 | A | * | 3/1962 | Schafer | 404/117 |
| 3,386,296 | A | * | 6/1968 | Matson | 74/87 |
| 3,396,294 | A | * | 8/1968 | Makino | 310/81 |
| 4,583,414 | A | * | 4/1986 | Wadensten | 74/87 |
| 6,483,216 | B2 | * | 11/2002 | Bouille et al. | 310/90.5 |
| 6,747,383 | B2 | * | 6/2004 | Tornquist et al. | 310/91 |
| 7,648,278 | B2 | * | 1/2010 | Stout et al. | 384/99 |
| 7,987,952 | B2 | * | 8/2011 | Phan et al. | 188/156 |

* cited by examiner

*Primary Examiner* — Thanh Lam
(74) *Attorney, Agent, or Firm* — Ted Masters

(57) ABSTRACT

A method and apparatus for mitigating bearing failure in an AC induction motor includes installing a high frequency mechanical vibration-absorbing material between various components of the motor. With the vibration-absorbing material in place, the number of premature bearing failures caused by the presence of bearing current is greatly reduced.

15 Claims, 4 Drawing Sheets

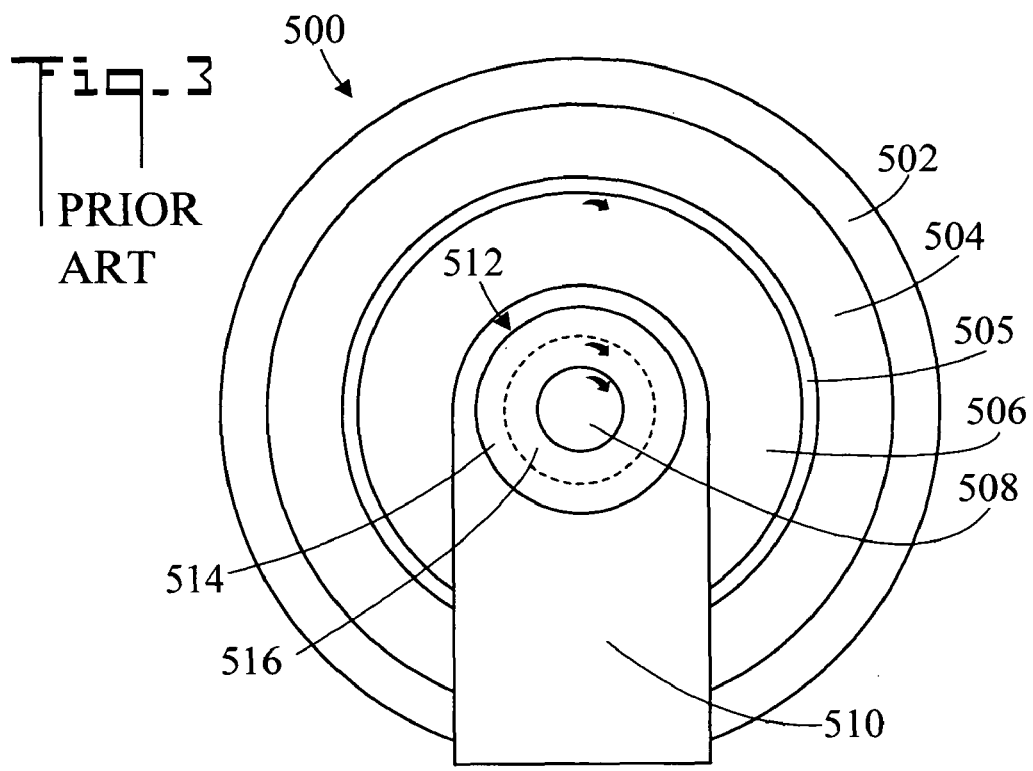
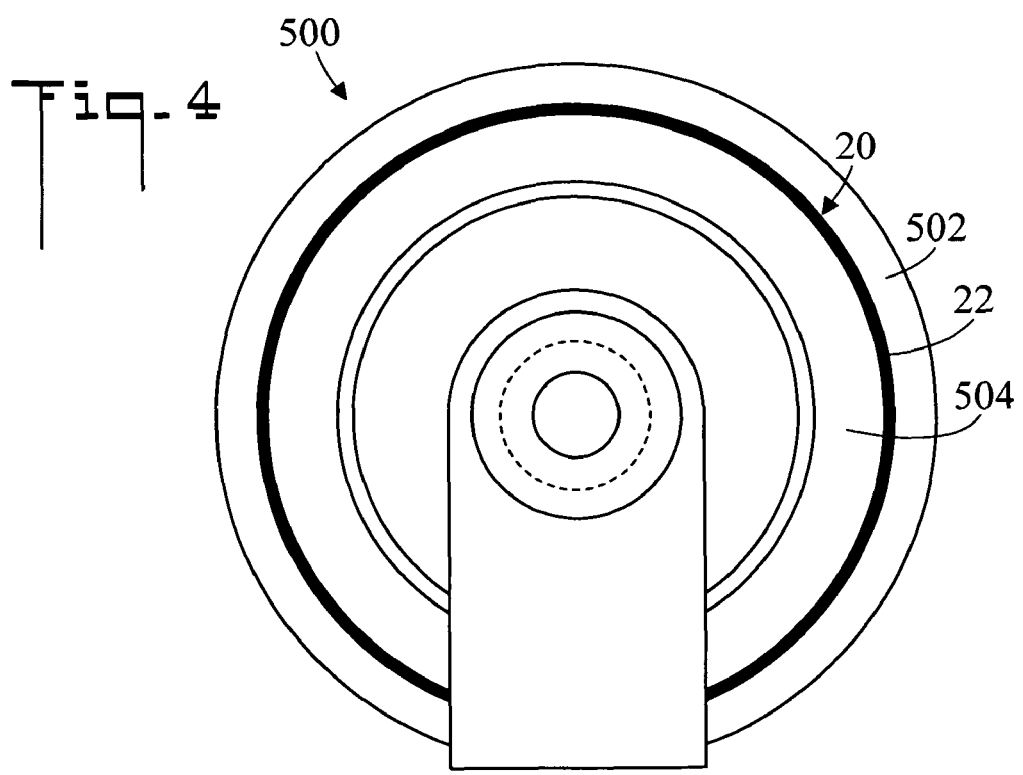

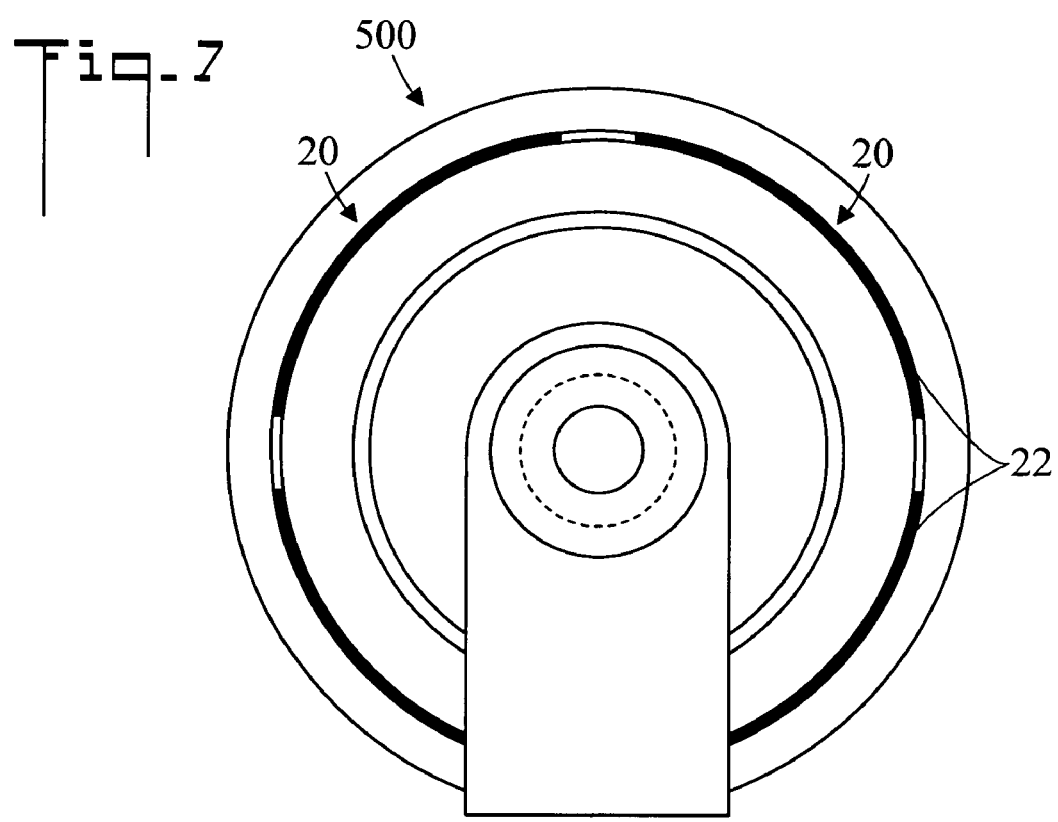

METHOD FOR MITIGATING BEARING FAILUE IN AN AC INDUCTION MOTOR AND APPARATUS THEREFOR

CROSS REFERENCE TO RELATED APPLICATION

This application claims the filing benefit under 35 U.S.C. §119(e) of U.S. Provisional Application No. 61/460,937, filed Jan. 11, 2011, which is hereby incorporated by reference.

TECHNICAL FIELD

The present invention pertains generally to bearings in AC induction motors, and more particularly to a method and apparatus for lessening bearing failure caused by high frequency mechanical vibrations.

BACKGROUND OF THE INVENTION

Published literature from manufacturers and users teaches that the bearings of AC induction motors powered from variable frequency drives are adversely affected by electrical current which circulates through the motor shaft and the bearings. In recent years, the incidence of premature bearing failures in AC induction motors powered from variable frequency drives has been increasing steadily, especially since the introduction of faster switching power electronics which allows better speed control by operating at higher operating frequencies utilized to generate sinusoidal waveforms. Because variable frequency drives use pulse switching techniques to provide a sinusoidal waveforms of variable frequency which is used to feed the motor stator field coils, the presence of faster switching waveforms allows more currents to be generated in the motor rotor, such current being available to circulate to ground by going through the bearings. The mechanism of failure of the bearings is identified as electrical arcing between the bearing races and its rotating balls or rollers. When electrical arcing occurs between the inner or outer race of a bearing, the energy in the electrical arc creates tiny pits in the bearing race, thereby initiating a self-sustaining mechanical destructive sequence where the pits generate more possibilities of arcing because of the surface deterioration of the metal.

In response to a continuously increasing number of electrical current related bearing failures in motors, the industry has developed a number of bearing current mitigating techniques associated with the utilization of variable frequency drive driven motors.

Stator coil design solutions involve reducing bearing current levels through coil design. The level of current made available to flow through the bearings of an AC motor is affected by the balancing of the magnetic field generated by each of the stator coils. Coil design solutions which are aimed at reducing the level of available bearing current have practical limitations. For AC induction motors, the limitations imposed on the design of field coils and their magnetic cores which generate very low levels of bearing current is the physical and electrical configuration of the field coils. Coil and core design options in motors are restricted by the need to provide electrical windings wound in physically opposite positions around the periphery of the motor frame. Winding and core design which would insure that no shaft current is generated in the rotor has been so far impossible to realize. Bearing electrical isolation solutions is another bearing current mitigating approach which has been developed. This involves coating the outer housing of the bearing, most often using plasma coatings to deposit a thin layer of ceramic type material displaying a high ohmic resistance. Unfortunately, the insulating coatings materials are brittle and thus are subject to loss of isolation due to the brittle ceramic coating added to bearing housings. The same may be said of bearings using ceramic coated steel segments.

Strategic equipment grounding techniques is yet a further solution to reduce the negative effects of bearing current. The goal of strategic grounding is to provide grounding paths which tend to minimize the level of available bearing current. The effectiveness of strategic equipment grounding techniques is subject to vary in time as electrical equipment is modified or added to new machinery and equipment in the electrical circuits attached to variable frequency drive of the motor. By providing new or different paths for the magnetic field to generate bearing currents, the current mitigating efficiency of strategic grounding locations is eventually nullified.

Shaft grounding techniques are yet another possibility for reducing the effect of bearing current is to provide a path for the current to flow to ground before reaching the bearing. This requires the installation of grounding brushes installed on the motor shaft. The use of grounding brushes has limitations regarding the level of shaft current it can carry to ground while preventing shaft voltage to rise significantly. The positioning of the grounding brushes is also critical in preventing a parallel current path through the bearing. Finally, the performance of the brushes diminishes as they wear and as dirt and other contaminants negatively affect the electrical resistance of the grounding brushes.

BRIEF SUMMARY OF THE INVENTION

This invention addresses the growing concern related to premature failures of bearings in AC induction motors, more particularly when driven from variable frequency drives. Published literature clearly documents that the passage of electrical current through a bearing results in failures because electrical arcing occurs between the rotating balls or rollers and the inner and outer races of the bearing. However, the literature does not fully explain the technical mechanism which causes the arching. The inventors have developed a theory, which has been demonstrated in practice, as to the cause of the electrical arching in bearings. The inventors propose that the primary cause of the electrical arching is mechanical forces resulting from the high frequency mechanical vibrations. It is well known in the ultrasonic cleaning field that high frequency vibrations produces cavitation during the cleaning process. Because the magnetic attraction between the field coils of the motor stator and the rotor generates high frequency vibrations, cavitation occurs in the lubricant inside the bearing, causing the electrical conductivity between inner and outer races of the bearing to become discontinuous. In order to prove that the presence of high frequency mechanical vibrations could effectively alter the electrical characteristics of a bearing, the following laboratory experiment has been performed. Electrical wires were soldered to the inner and outer races of an ordinary 6201 bearing. As illustrated in FIG. 1, a 20 kHz electrical signal was applied to the bearing when it was submerged in an oil bath in the cavity of an ultrasonic cleaning device. The resulting waveform illustrates that when subjected to high frequency vibrations, the electrical contact between the inner and outer races of the bearing is broken under the influence of the high frequency shocks shown as spikes 10. FIG. 2 illustrates the effects on the waveform of the same level of high frequency vibrations with the same bearing resting in the ultrasonic cleaner cavity on a soft plastic cup, designed to absorb a large portion of the shock waves, thus reducing the level of high frequency shock waves, and eliminating the random interruption of electrical contact between the inner and outer races of the bearing. The experiment demonstrates that high frequency vibrations contribute to bearing failures under the presence of current flowing through the bearing.

As shown in FIG. 1, the inventors have demonstrated by lab experiments and by field measurements that the magnetic attraction between the stator and the rotor in AC induction motors results in mechanical excitation of the motor rotor at the frequency of the power supply. This frequency is normally between 3 kHz and 30 kHz for variable frequency driven AC induction motors. Even though the amplitude of the mechanical vibrations is very low, in the order of 7 mm E-6, the vibrations are of sufficient amplitude to cause cavitation in the medium used as lubricant for the bearing races. In turn, the cavitation causes the electrical contact between the inner and outer races of the bearing to perform rapid make and break actions, resulting in the instantaneous interruption of current flow which leads to electrical arcing and eventual pitting of the bearing races.

The present invention is directed to a method and apparatus for reducing premature bearing failures by significantly reducing the level of high frequency vibrations in an AC induction motor. The method and apparatus utilizes a vibration-absorbing material to prevent high frequency vibrations from reaching the bearing. The vibration-absorbing material can be placed at any or all of the following locations (1) between the motor frame and the stator, (2) between the bearing mount and the bearing outer race; and (3) between the bearing inner race and the motor shaft.

In a preferred embodiment, an improved AC induction motor is disclosed. The AC induction motor is of the type having a motor frame, a stator, a rotor having a shaft, an air gap between the stator and the rotor, a bearing mount, and a bearing having a outer race and an inner race. The improvement comprises:

a vibration-absorbing material disposed in at least one of the following locations;

(1) between the motor frame and the stator;

(2) between the bearing mount and the outer race; and, (3) between the inner race and the shaft.

In another embodiment, the vibration-absorbing material is disposed between the motor frame and the stator.

In another embodiment, the vibration-absorbing material is disposed between the bearing mount and the outer race.

In another embodiment, the vibration-absorbing material is disposed between the inner race and the shaft.

In another embodiment, the vibration-absorbing material is a silicone rubber.

In another embodiment, the vibration-absorbing material has a Shore A hardness of between about 30 and about 60.

In another embodiment, the vibration-absorbing material limits relative motion of the stator and the rotor so the air gap is always maintained.

Other embodiments, in addition to the embodiments enumerated above, will become apparent from the following detailed description, taken in conjunction with the accompanying drawings, which illustrate, by way of example, the principles of the method and apparatus.

BRIEF DESCRIPTION OF THE DRAWINGS

FIG. 3 is an end elevation view of a prior art AC induction motor;

FIG. 4 is an end elevation view of an AC induction motor including a first embodiment of a method and apparatus for mitigating bearing failure in the AC induction motor;

DETAILED DESCRIPTION OF THE INVENTION

Figure 1:
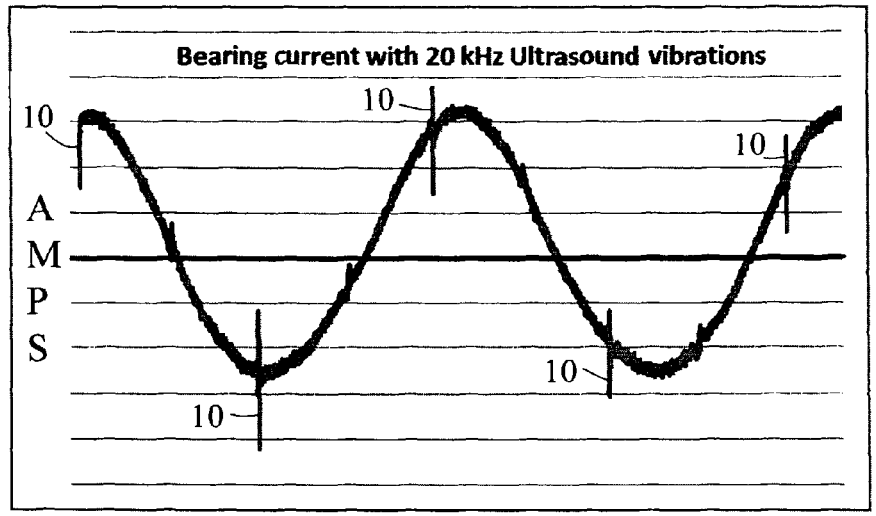
FIG. 1 shows the high frequency voltage waveform when a bearing is subjected to high frequency vibrations and is firmly attached to a supporting frame.
Figure 2:
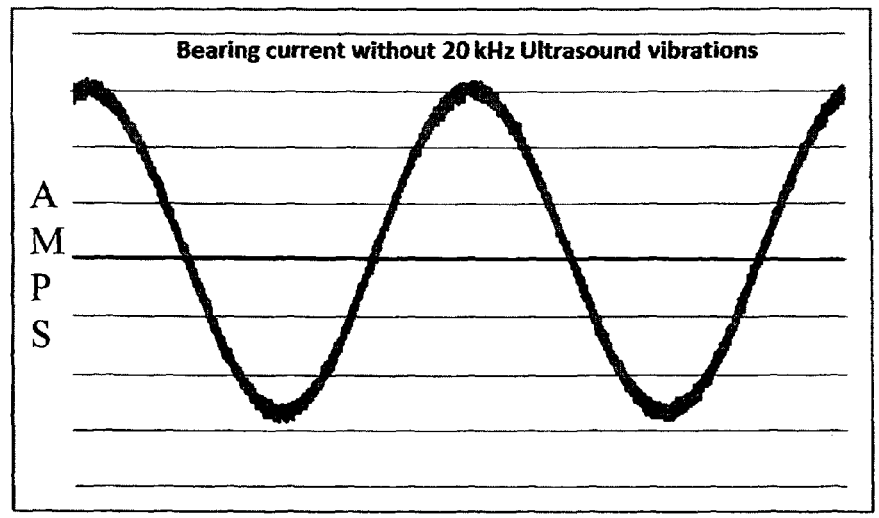
FIG. 2 shows the high frequency voltage waveform when a bearing is subjected to high frequency vibrations and is attached to a supporting frame using a vibration-absorbing spacer.

Referring initially to FIG. 3, there is illustrated an end elevation view of a prior art AC induction motor, generally designated as 500. Motor 500 has a motor frame 502, a stator 504, a rotor 506 having a shaft 508, an air gap 505 between stator 504 and rotor 506, a bearing mount 510, and a bearing 512 having an outer race 514 and an inner race 516. In the shown embodiment, bearing 512 is either a ball bearing or roller bearing. Stator 504 is rigidly connected to frame 502. Rotor 506 is maintained in place by bearing 512. Outside race 514 of bearing 512 is rigidly connected to bearing mount 510, and inner race 516 of bearing 512 is rigidly connected to rotor shaft 508. In the figure, the broken circle represents the path of rotation of inner race 516 with respect to outer race 514 of bearing 512. Because of air gap 505, rotor 506, inner race 516, and rotor shaft 508 are free to rotate with respect to fixed motor frame 502, stator 504, bearing mount 510, and outer race 514. In the figure arrows show which elements freely rotate.

Referring now to FIG. 4, there is shown an end elevation view of an AC induction motor 500 which includes a first embodiment of a method and apparatus for mitigating bearing failure in the motor, generally designated as 20. To prevent high frequency vibrations from exciting bearing 512 and causing cavitation, a resilient vibration-absorbing material 22 in the form of a dampening spacer is circumferentially inserted between motor frame 502 and stator 504. In an embodiment, the hardness of vibration-absorbing material 22 can vary between a Shore A hardness of about 30 and about 60, as is obtainable using for example a Dow Corning® silicone rubber RTV 3110.

The reference to a specific silicone material and Shore A harnesses are to be seen as examples only. Many other materials known to the industry are suitable to be used in the design of attenuators for high frequency vibrations. Additionally, the vibration-absorbing spacers 22 can consist of physically separated vibration-absorbing spacers 22 rather than a continuous spacer installed around stator 504 (refer to FIG. 7). Actual physical shaft displacement data at 20 kHz was measured in a laboratory environment to be approximately 7 mm E-06. This value represents a very small displacement. Because the actual physical displacement of the motor shaft is very small in amplitude, the rigidity and thickness of high frequency vibration-absorbing material 22 can be chosen to limit the physical displacement of the stator 504 from being excessively large under the influence of the magnetic field, thus preventing it from appreciably reducing the air gap 505 between the stator 504 and rotor 506 from becoming too small or nonexistent (i.e. a sufficient air gap 505 is always maintained). In other words, the shape and thickness of vibration-absorbing material 22 is such that it prevents stator 504 from directly contacting motor rotor 506. Put another ways, vibration-absorbing material 22 is chosen so that it limits the relative motion of stator 504 and rotor 506 so that air gap 505 is always maintained. In an embodiment, a 1/16 inch thickness has been found useful.

Figure 5:
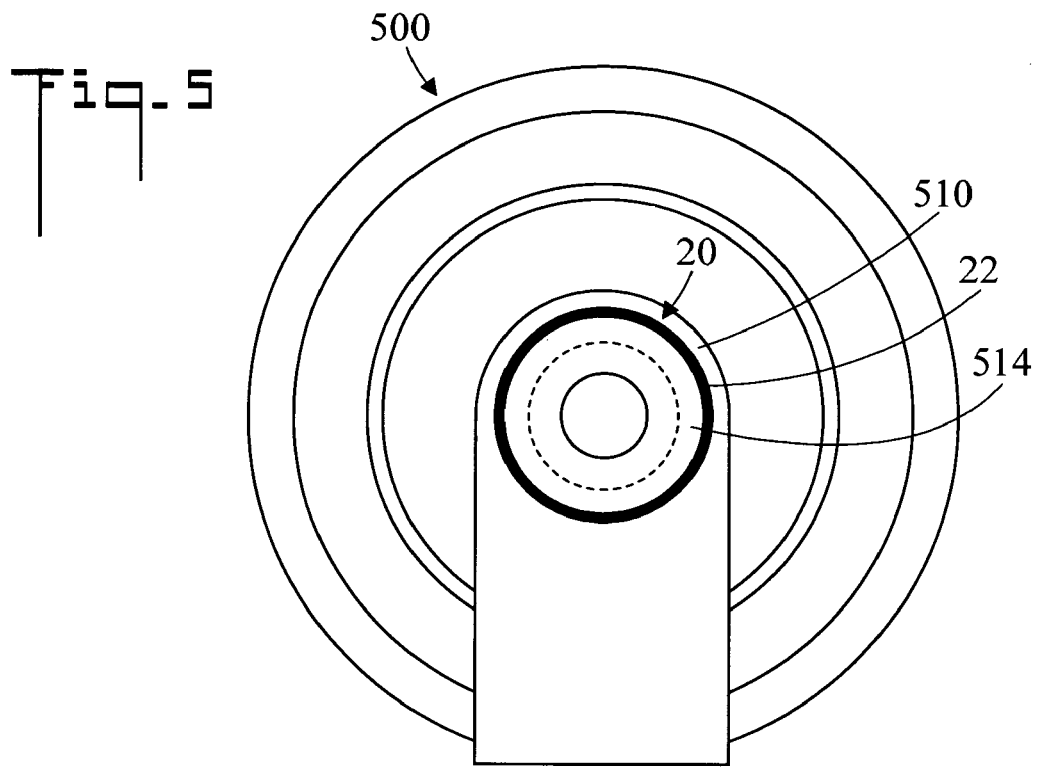
FIG. 5 is an end elevation view of an AC induction motor including a second embodiment of the method and apparatus for mitigating bearing failure in the AC induction motor; and, FIG. 6 is an end elevation view of an AC induction motor including a third embodiment of the method and apparatus for mitigating bearing failure in the AC induction motor; and, FIG. 7 is an end elevation view showing another placement of vibration-absorbing material.

FIG. 5 is an end elevation view of an AC induction motor 500 which includes a second embodiment of the method and apparatus for mitigating bearing failure in the motor. In this embodiment vibration-absorbing material 22 is placed between bearing mount 510 and outer race 514 of bearing 512.

Figure 6:
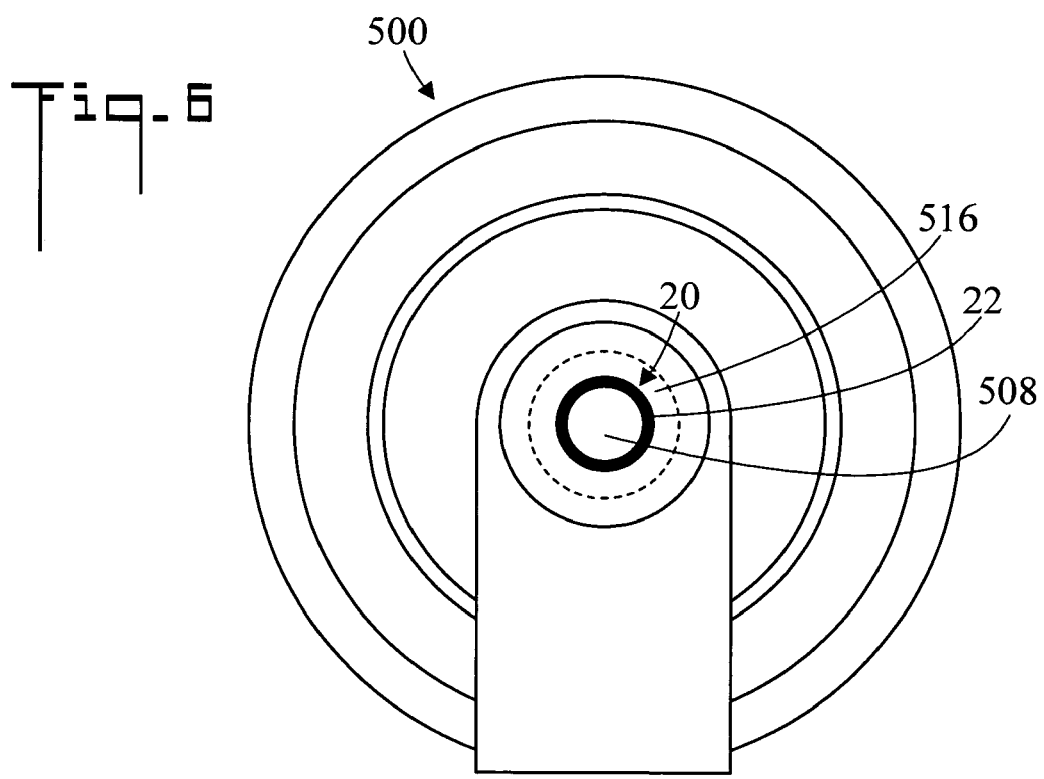

FIG. 6 is an end elevation view of an AC induction motor 500 which includes a third embodiment of the method and apparatus for mitigating bearing failure in the motor. In this embodiment vibration-absorbing material 22 is placed between inner race 516 of bearing 512 and shaft 508 of rotor 506.

FIG. 7 is an end elevation view showing another placement of vibration-absorbing material 22. In this embodiment vibration-absorbing spacers 22 consist of a plurality of physically separated vibration-absorbing spacers 22 rather than the continuous spacers shown in FIGS. 4-6.

In summary, a method for mitigating bearing failure in an AC induction motor 500 having a motor frame 502, a stator 504, a rotor 506 having a shaft 508, an air gap 505 between stator 504 and rotor 506, a bearing mount 510, and a bearing 512 having an outer race 514 and an inner race 516, includes:

placing a vibration-absorbing material 22 in at least one of the following locations;
(1) between motor frame 502 and stator 504;
(2) between bearing mount 510 and outer race 514; and,
(3) between inner race 516 and shaft 508.

The method further including:
placing vibration-absorbing material 22 between motor frame 502 and stator 504.

The method further including:
placing vibration-absorbing material 22 between bearing mount 510 and outer race 514.

The method further including:
placing vibration-absorbing material 22 between inner race 516 and shaft 508.

The method further including:
vibration-absorbing material 22 being a silicone rubber.

The method further including:
vibration-absorbing material 22 having a Shore A hardness of between about 30 and about 60.

The method further including:
vibration-absorbing material 22 limiting relative motion of stator 504 and rotor 506 so air gap 505 is always maintained.

The embodiments of the method and apparatus described herein are exemplary and numerous modifications, combinations, variations, and rearrangements can be readily envisioned to achieve an equivalent result, all of which are intended to be embraced within the scope of the appended claims. Further, nothing in the above-provided discussions of the method and apparatus should be construed as limiting the invention to a particular embodiment or combination of embodiments. The scope of the invention is best defined by the appended claims.

The invention claimed is:

1. A method for mitigating bearing failure in an AC induction motor having a motor frame, a stator, a rotor having a shaft, an air gap between the stator and the rotor, a bearing mount, and a bearing having an outer race and an inner race, the method comprising:
(a) placing a vibration-absorbing material in at least one of the following locations;
(1) between the motor frame and the stator; and,
(2) between the inner race and the shaft, and:
(b) said vibration-absorbing material reducing electrical arcing in the bearing.

2. The method according to claim 1, further including:
placing said vibration-absorbing material between the motor frame and the stator.

3. The method according to claim 1, further including:
in (b), said vibration-absorbing material reducing vibrations in the 20 kHz range.

4. The method according to claim 1, further including:
placing said vibration-absorbing material between the inner race and the shaft.

5. The method according to claim 1, further including:
said vibration-absorbing material being a silicone rubber.

6. The method according to claim 1, further including:
said vibration-absorbing material having a Shore A hardness of between about 30 and about 60.

7. The method according to claim 1, further including:
said vibration-absorbing material limiting relative motion of the stator and the rotor so the air gap is always maintained.

8. An improved AC induction motor of the type having a motor frame, a stator, a rotor having a shaft, an air gap between the stator and the rotor, a bearing mount, and a bearing having a outer race and an inner race, the improvement comprising:
a vibration-absorbing material disposed in at least one of the following locations;
(1) between the motor frame and the stator; and
(2) between the inner race and the shaft; and,
said vibration-absorbing material reducing electrical arcing in the bearing.

9. The improved AC induction motor according to claim 8, further including:
said vibration-absorbing material disposed between the motor frame and the stator.

10. The improved AC motor according to claim 8, further including:
said vibration-absorbing material reducing vibrations in the 20 kHz range.

11. The improved AC induction motor according to claim 8, further including:
said vibration-absorbing material disposed between the inner race and the shaft.

12. The improved AC induction motor according to claim 8, further including:
said vibration-absorbing material being a silicone rubber.

13. The improved AC induction motor according to claim 8, further including:
said vibration-absorbing material having a Shore A hardness of between about 30 and about 60.

14. The improved AC induction motor according to claim 8, further including:
said vibration-absorbing material limiting relative motion of the stator and the rotor so the air gap is always maintained.

15. The improved AC induction motor according to claim 8, further including:
said vibration-absorbing material reducing vibrations in the 20 kHz range;
said vibration-absorbing material being a silicone rubber;
said vibration-absorbing material having a Shore A hardness of between about 30 and about 60; and,
said vibration-absorbing material limiting relative motion of the stator and the rotor so the air gap is always maintained.

* * * * *

UNITED STATES PATENT AND TRADEMARK OFFICE
CERTIFICATE OF CORRECTION

| | | |
|---|---|---|
| PATENT NO. | : 8,247,932 B1 | Page 1 of 1 |
| APPLICATION NO. | : 13/373538 | |
| DATED | : August 21, 2012 | |
| INVENTOR(S) | : Rene Larive et al. | |

It is certified that error appears in the above-identified patent and that said Letters Patent is hereby corrected as shown below:

Col 5, line 57, delete "The invention claimed is:" and insert -- We claim: --

Signed and Sealed this
Thirteenth Day of November, 2012

David J. Kappos
*Director of the United States Patent and Trademark Office*